(12) United States Patent
Hydrick

(10) Patent No.: US 10,494,220 B1
(45) Date of Patent: Dec. 3, 2019

(54) EASY COIL FOR EXTENSION CORDS AND OTHER ELECTRICAL CABLES

(71) Applicant: Bret Daniel Hydrick, North Augusta, SC (US)

(72) Inventor: Bret Daniel Hydrick, North Augusta, SC (US)

( * ) Notice: Subject to any disclaimer, the term of this patent is extended or adjusted under 35 U.S.C. 154(b) by 0 days.

(21) Appl. No.: 16/153,698

(22) Filed: Oct. 5, 2018

(51) Int. Cl.
*H04M 1/15* (2006.01)
*B65H 55/00* (2006.01)

(52) U.S. Cl.
CPC .............. *B65H 55/00* (2013.01); *H04M 1/15* (2013.01)

(58) Field of Classification Search
CPC ...... B65H 55/00; B65H 55/005; B65H 55/04; H04M 1/15
USPC ...................................................... 191/12 R
See application file for complete search history.

(56) References Cited

U.S. PATENT DOCUMENTS

| | | | | |
|---|---|---|---|---|
| 1,179,700 A * | 4/1916 | Cornell | ................... | H04M 1/15 379/438 |
| 1,708,165 A * | 4/1929 | Willat | ................... | H02G 11/003 267/74 |
| 2,795,641 A * | 6/1957 | Rowell | ................... | F16F 1/04 174/135 |
| 4,357,500 A * | 11/1982 | Nilsen | ................... | H04M 1/15 174/69 |
| 4,679,234 A * | 7/1987 | Earwood, Sr. | .......... | H04M 1/15 174/69 |
| 4,890,361 A * | 1/1990 | Crookham | ............. | H04M 1/15 24/129 D |
| 5,168,128 A * | 12/1992 | Thomsen | ............... | H01R 13/72 174/135 |
| 5,710,812 A * | 1/1998 | Fogel | ..................... | H04M 1/15 379/438 |
| 6,215,068 B1 * | 4/2001 | Meier | .................... | H02G 11/00 174/68.1 |
| 7,355,119 B2 * | 4/2008 | Katz | ..................... | H02G 3/0475 174/5 R |
| 2008/0301913 A1 * | 12/2008 | Alfarone | ............... | H02G 11/00 24/115 R |

* cited by examiner

*Primary Examiner* — Mark T Le

(57) ABSTRACT

An Easy Coil configuration is designed to facilitate handling of extension cords or other electrical cables. The coil configuration includes multiple sections, wherein the first section is flexible and includes a different color stripe to show the top of the coil, the second section is stiffened, the third section is flexible with weight added to the bottom of the section, and the fourth section is stiffened. Colored stripes are provided along the length of the coil to show when it is twisted. For other electrical cables such as those used in the music industry, textural variations instead of colored stripes may be used.

1 Claim, 1 Drawing Sheet

METHOD OF CONFIGURING AN EASY COIL

- providing a cord
- measuring and dividing the cord into sections
- adding stiffeners to alternating sections to create stiffened sections
- leaving other sections without stiffeners to create flexible sections
- coiling the cord to form a coil
- adding weight to a flexible section of the coil
- adding color across the first flexible section of the coil to show the top of the coil
- adding colored stripe/textured variation along the length of the coil to show when it is twisted

EASY COIL FOR EXTENSION CORDS AND OTHER ELECTRICAL CABLES

BACKGROUND OF THE INVENTION

Existing extension cords and other electrical cables are known to bend, twist and even become tied in knots due to improper or inconsistent coiling. It can be aggravating to have to untie an extension cord before using it.

SUMMARY OF THE INVENTION

The present invention provides a method for configuring an easy coil to avoid the above undesirable drawbacks. This method can also be used to fix damaged cords. The method includes configuring a coil to include different colored stripes or textural variations, different sections having alternating stiffness and flexibility, and additional weight at the bottom of a section, wherein the alternating stiffness and flexibility and the additional weight are designed to prevent improper coiling of the cord.

BRIEF DESCRIPTION OF THE DRAWING

A single FIG. of drawing showing boxes representing the method steps of configuring the easy coil of the present invention.

DETAILED DESCRIPTION OF THE PRESENT INVENTION

The purpose of this invention is to change a manufacturing process for extension cords and other electrical cables. The invention can also be used for retrofitting old or used cables to resolve a common problem with extension cords that don't coil properly.

The present invention is an inexpensive solution that includes a method of providing an easy coil divided into four sections provided with a different colored stripe along the length of the coil to indicate when it is twisted. Alternatively, the coil can be provided with a rough textural variation along the length of the coil instead of the different colored stripe. Such rough textural variation would be preferable for cables used in the music industry, wherein the coil can't be seen with a different colored stripe. The sections of the coil include two stiffened sections, wherein the length and stiffness of these stiffened sections are variable depending upon the type of extension cord or electrical cable that is being used, and a flexible section, wherein a heavy weight can be spread out over the bottom half of the section. The coil is configured such that it is light at the top, heavy at the bottom, and has alternating stiffened and flexible sections to create a far more manageable and durable product. In the present invention, the flexibility, stiffness, and weight of the coil are all variables, and can be changed depending on the type of cord being produced. For flexibility and stiffness there are many options to consider. One option would be to increase the thickness of the covering on the sections to be stiffened and leave other sections without the increase of thickness for flexibility. Cheap dense materials should be used for weight.

A slight bulge in the flexible section is an option to consider. The weight can be spread out over the bottom half of the selected section of the coil. Most users would prefer a heavier more manageable product. Color and texture can be added to show the user how to coil the cord. They can also be used for marketing, giving the product a unique appearance. The cord would be coiled from one stripe to the next. Stripes can be provided across the coil to show where to bend it. Stripes along the length of the coil can be provided to show when it's twisted. Another application is in the music industry where many cables are coiled and uncoiled repeatedly. In this industry, texture would be provided to substitute for color.

Prototypes

Materials for building prototypes—extension cord, measuring tape, electrical tape, colored tape, weights (such as fishing weights), and baling wire (a non-conductive material would be used on the final product).

I built two prototypes of easy coils—the first had eight-inch stiffened sections and twelve-inch flexible sections; and the second had twelve-inch stiffened sections and eight-inch flexible sections. The second one worked better. The first one needed more weight.

An easy coil prototype can be built with the following steps (see also the single FIG. of drawing)—measuring eight inches from an end of the cord; wrapping baling wire around the next twelve inches; measuring another eight inches; wrap baling wire around the next twelve inches; repeat the process until getting near the end of the cord; coiling the cord and taping weight to the bottom of a flexible section of the coil; adding color across the first flexible section of the coil to show the top of the coil; and adding a colored stripe or a textural variation along the length of the coil to show when it is twisted. This design prevents the cord from being coiled improperly. A damaged cord may need more weight. A heavier cord works better. The flexibility, stiffness, weight, and color or texture in the present invention are all used to create a consistent coil that is more durable and easier to handle.

The invention claimed is:

1. A method of configuring an easy coil to prevent improper handling of a cord or cable, comprising the steps of:
   providing a cord or a cable;
   dividing the cord or cable into different sections;
   adding stiffeners to alternating sections while leaving other ones of the sections flexible without stiffeners so as to create alternating stiffened sections and flexible sections along the length of the cord or cable;
   coiling the cord or cable into a coil;
   adding weight to a bottom portion of at least one of the flexible sections;
   providing at least a colored stripe or a textural variation along the length of the coil; and
   wherein, the alternating stiffened and flexible sections with at least one of the flexible sections having the added weight are configured to facilitate proper and consistent handling of the coil.

* * * * *